(12) United States Patent
Chien et al.

(10) Patent No.: US 12,434,377 B2
(45) Date of Patent: Oct. 7, 2025

(54) LIFTING MECHANISM AND ROBOT EMPLOYING MECHANISM

(71) Applicants: Futaijing Precision Electronics (Yantai) Co., Ltd., Yantai (CN); HON HAI PRECISION INDUSTRY CO., LTD., New Taipei (TW)

(72) Inventors: Chun-Yuan Chien, New Taipei (TW); Ya-Wei Yi, New Taipei (TW)

(73) Assignees: Futaijing Precision Electronics (Yantai) Co., Ltd., Yantai (CN); HON HAI PRECISION INDUSTRY CO., LTD., New Taipei (TW)

(*) Notice: Subject to any disclaimer, the term of this patent is extended or adjusted under 35 U.S.C. 154(b) by 280 days.

(21) Appl. No.: 18/133,426

(22) Filed: Apr. 11, 2023

(65) Prior Publication Data

US 2023/0339098 A1 Oct. 26, 2023

(30) Foreign Application Priority Data

Apr. 26, 2022 (CN) .......................... 202210449987.X

(51) Int. Cl.
B25J 5/02 (2006.01)
B25J 9/00 (2006.01)
B25J 13/08 (2006.01)

(52) U.S. Cl.
CPC .............. B25J 9/0009 (2013.01); B25J 5/02 (2013.01); B25J 13/088 (2013.01)

(58) Field of Classification Search
CPC . B25J 13/088; B25J 5/02; B25J 9/0009; B25J 9/10
See application file for complete search history.

(56) References Cited

U.S. PATENT DOCUMENTS

| | | | | |
|---|---|---|---|---|
| 4,815,781 A | * | 3/1989 | No .......................... | B65G 47/90 |
| | | | | 414/751.1 |
| 5,368,435 A | * | 11/1994 | Bostad ..................... | B66F 9/148 |
| | | | | 414/667 |
| 11,517,958 B2 | * | 12/2022 | Lim ........................ | B21D 43/24 |
| 11,648,677 B2 | * | 5/2023 | Taylor ..................... | B25J 19/023 |
| | | | | 700/245 |

FOREIGN PATENT DOCUMENTS

| | | |
|---|---|---|
| CN | 203818138 U | 9/2014 |
| CN | 108080826 | 5/2018 |
| CN | 110599667 A | 12/2019 |
| TW | 202116506 | 5/2021 |

* cited by examiner

*Primary Examiner* — Thai T Dinh

(74) *Attorney, Agent, or Firm* — ScienBiziP, P.C.

(57) ABSTRACT

A lifting mechanism comprises a lifting member, a first detection element and a second detection element. The lifting mechanism is applied to a robot, the robot comprises a controller, the controller is electrically connected with the lifting mechanism. The first detection element and the second detection element detect a height of the at least two guide rods, the controller controls the lifting member to move up or down according to the first position signal output by the first detection element and the second position signal output by the second detection element, so that the lifting mechanism can accurately locate the highest ascending position and lowest descending position of the lifting mechanism. A robot is also provided.

18 Claims, 5 Drawing Sheets

LIFTING MECHANISM AND ROBOT EMPLOYING MECHANISM

TECHNICAL FIELD

The subject matter herein generally relates to robot technology.

BACKGROUND

With the development of industrial technology, in order to increase the functionality and extensibility of robots, additional functional modules, such as robotic arms and trailer mechanism, are usually installed on robots to meet different functional requirements. In practice, a lifting mechanism is one of the most common functional modules.

In the existing technology, the lifting height of the lifting mechanism is mainly monitored by preset software. But the calculation error of preset software may cause deviations of lifting height stroke, and resulting in the lifting structure strokes exceeding the lifting height capacity of the lifting structure, extruding the top or bottom plate, and deformation and damage of the lifting structure.

BRIEF DESCRIPTION OF THE DRAWINGS

Implementations of the present technology will now be described, by way of example only, with reference to the attached figures.

DETAILED DESCRIPTION

Figure 1:
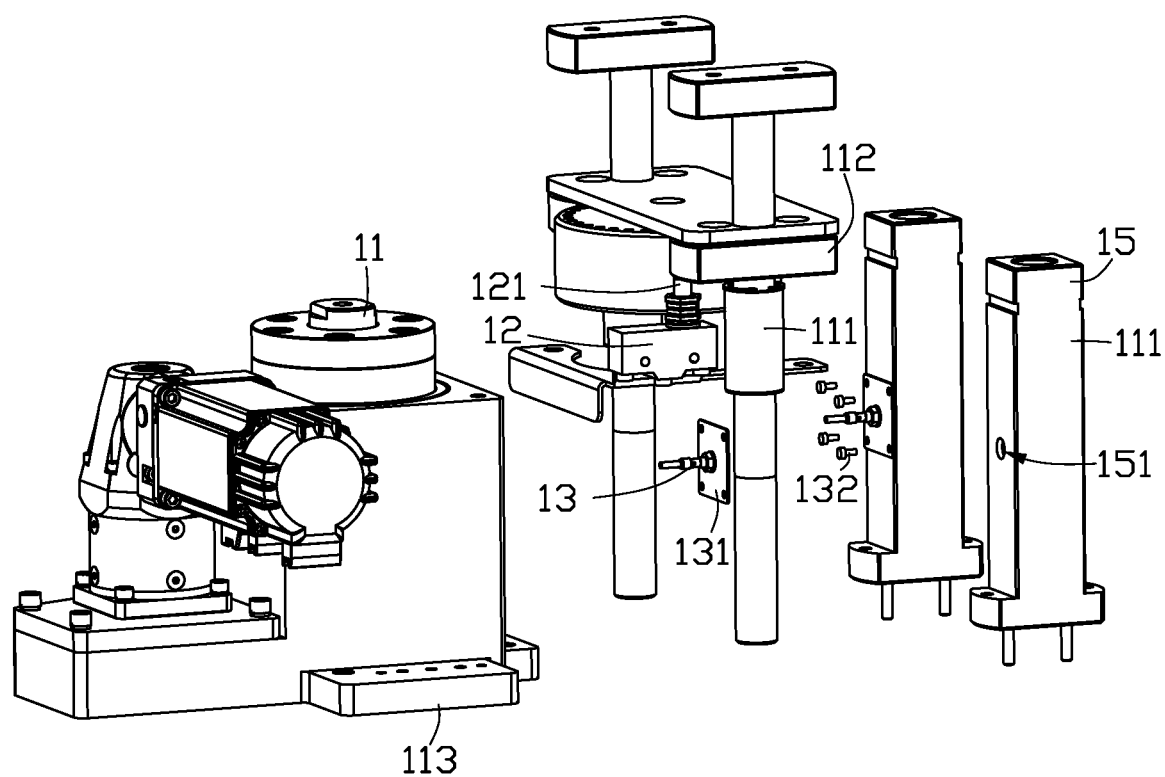
FIG. 1 is a diagram of a decomposed structure of a lifting mechanism of an embodiment according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
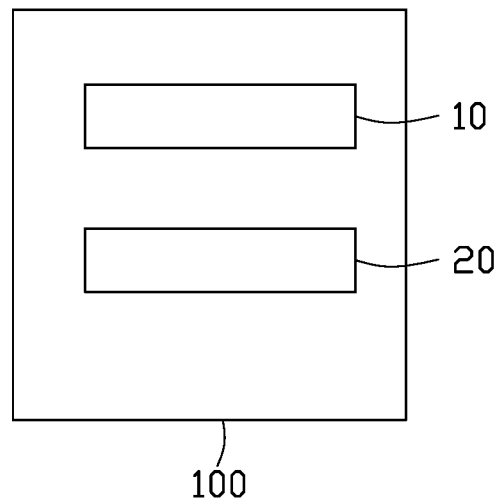
FIG. 2 is a diagram of an embodiment of a robot according to the present disclosure.

FIG. 1 is a diagram of a decomposed structure of a lifting mechanism 10 of an embodiment according to the present disclosure. The lifting mechanism 10 can be set in a robot 100 as shown in FIG. 2 and configured to effectively locate the actual lifting position. The robot 100 comprises a controller 20. The robot 100 can be an operating robot applied to production lines, a sweeping robot, a medical robot, an exploration robot and so on. The controller 20 can be a MCU (Microprogrammed Control Unit), a FPGA (field-programmable gate array), or other chips with processing capabilities.

The lifting mechanism 1 comprises a lifting member 11, a first detection element 12, a second detection element 13. The lifting member 11 comprises at least two guide rods 111, the at least two guide rods 111 are arranged on both sides of the lifting member 11 and extend along a lifting direction of the lifting member 11, the at least two guide rods 111 are connected through the top plate 112 at the top of the at least two guide rods 111, the lifting member 11 is fixedly connected to the top plate 112, the lifting member 11 is configured to drive the at least two guide rods 111 to move up or down along the lifting direction.

The first detection element 12 is arranged at a first distance from the top plate 112, and the first detection element 12 is separable from the top plate 112, the first detection element 12 is configured to detect a height of the at least two guide rods 111, and send a first position signal when detecting the at least two guide rods are located at a first height H1. The second detection element 13 is arranged at a second distance from the top plate 112, and the second detection element is separable from the at least two guide rods 111, the second detection element 13 is configured to detect a height of the at least two guide rods 111, and send a second position signal when detecting the at least two guide rods 111 are located at a second height H2. The controller 20 is electrically connected with the first detection element 12 and the second detection element 13. The controller 20 is configured to control the lifting member 11 to move up or down according to the first position signal or the second position signal.

In one embodiment, the lifting mechanism 10 further comprises a bottom plate 113 arranged at the bottom of the lifting mechanism 10. The bottom plate 113 is arranged relative to the top plate 112, and the first detection element 12 and the second detection element 13 are arranged between the bottom plate 113 and the top plate 112. The first height H1 is the lowest position that the lifting member 11 can descend, and the second height H2 is the highest position that the lifting member 11 can ascend. For example, with the bottom plate 113 as the control structure, the first height H1 can be 0 mm and the second height H2 can be 80 mm, that is, the lowest position that the lifting member 11 can descend is to contact the bottom plate 113, and the highest position that the lifting member 11 can ascend is 80 mm away from the bottom plate 113.

In the above embodiment, the lifting mechanism 10 can detect the actual position of the lifting member 11 by two different sensing modes of the first detection element 12 and the second detection element 13, to effectively locate the height of the lifting member 11 and accurately stop the lifting member 11 at the highest or the lowest position. Thus to avoid the lifting member 11 to move beyond the preset standard lifting height in the process of lifting and result in components at the top or bottom of the lifting member 11 being squeezed or damaged.

In one embodiment, the first detection element 12 comprises a convex column 121, the convex column 121 is arranged near the top plate 112 along the lifting direction, part of the convex column 121 is movably set in the first detection element 12, the other part of the convex column 121 protrudes outside of the first detection element 12 and is separable from with the top plate 112.

In one embodiment, the first detection element 12 can be a micro switch arranged near the top plate 112. When the lifting member 11 descends to the first height H1, the top plate 112 is driven to press the convex column 121, and the convex column 121 is pressed down to trigger the first position signal, so that the controller 20 controls the lifting member 11 to stop descending according to the first position signal, and limits the lowest position that the lifting member 11 can descend. For example, the convex column 121 is pushed down by about 0.44 mm. The first detection element 12 can be a panel mounted plunger type structure to limit the lowest position that the lifting member 11 can descend. The structure of the first detection element 12 is easy to realize and can accurately locate the lifting member 11.

Figure 3:
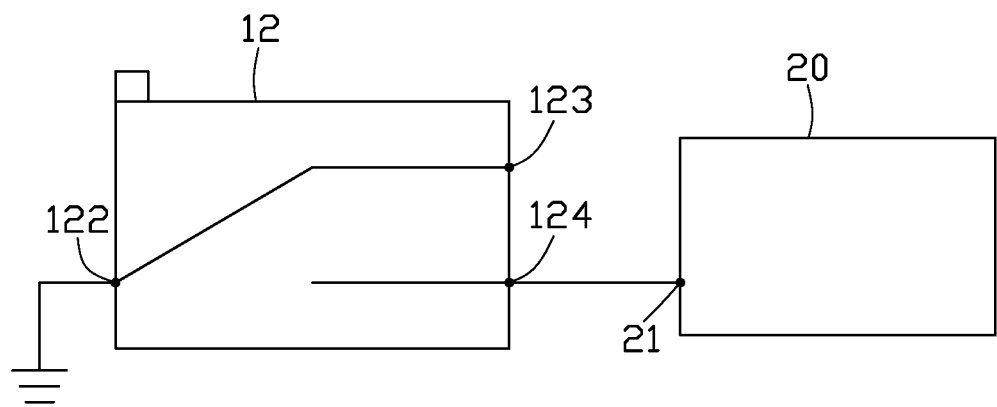
FIG. 3 is a diagram of a circuit structure of a first detection element according to the present disclosure.

FIG. 3 is a diagram of a circuit structure of the first detection element 12.

In one embodiment, the first detection element 12 further comprises a first contact 122, a second contact 123 and a third contact 124, the first contact 122 is electrically connected with the second contact 123. When the lifting member 11 drives the at least two guide rods 111 moving down to the first height H1 along the lifting direction, the top plate 112 is in contact with the convex column 121, and switches the circuit connection state from the first contact 122 electrically connecting with the second contact 123 to the first contact 122 electrically connecting with the third contact 124. The first detection element 12 sends out the first position signal when the first contact 122 is electrically connected with the third contact 124, and the controller 20 controls the lifting member 11 to stop moving down.

In one embodiment, the first contact 122 is a COM common, and the second contact 123 is a NO (normally open) contact. The NO contact is disconnected when it is not energized, and is closed after energized under the action (suction) of the electromagnetic coil. The third contact 124 is a NC (normally closed) contact. The NC contact is normally closed when it is not energized, and is closed after energized under the action (suction) of the electromagnetic coil.

The first detection element 12 switches the connection state of the first contact 122 to the second contact 123 and the third contact 124 when the lifting member 11 descends to press the convex column 121, and triggers the controller 20 to realize the limit of lowest position of the lifting member 11.

In one embodiment, the lifting mechanism 10 further comprises a guide rod sleeve 15, the at least two guide rods 111 are movably arranged in the guide rod sleeve 15, the second detection element 13 is arranged in a preset position on the guide rod sleeve 15 at a preset distance from the at least two guide rods 111.

In one embodiment, the second detection element 13 can be a proximity switch, and the guide rod 111 is wrapped with a metal sleeve. The lifting member 11 drives guide rod 111 away from the second detection element 13 during the ascending process. When the lifting member 11 rises to the second height H2, the second detection element 13 cannot detect the existence of the metal sleeve outside the guide rod 111 and triggers the second position signal, so that the controller 20 controls the lifting member 11 to stop ascending according to the second position signal, and realize the limit of highest lifting position of the elevating member 11.

In one embodiment, the guide rod sleeve 15 comprises a through hole 151, and the second detection element 13 passes through the through hole 151 at a preset distance from the guide rod 111. For example, the preset distance is 2 mm. The second detection element 13 further comprises a fixed plate 131 and a fixed part 132. The fixed part 132 passes through the fixed plate 131 and the guide rod sleeve 15 along the second direction, and the second detection element 13 is fixed on the guide rod sleeve 15.

In one embodiment, the second detection element 13 is installed on the guide rod sleeve 15, which does not require additional perforation of the metal sleeve outside the guide rod 111 to increase the pressing structural components configured to press something like micro switches, and can avoid the weakening of the overall structural strength of the guide rod 111 due to the perforation.

Figure 4:
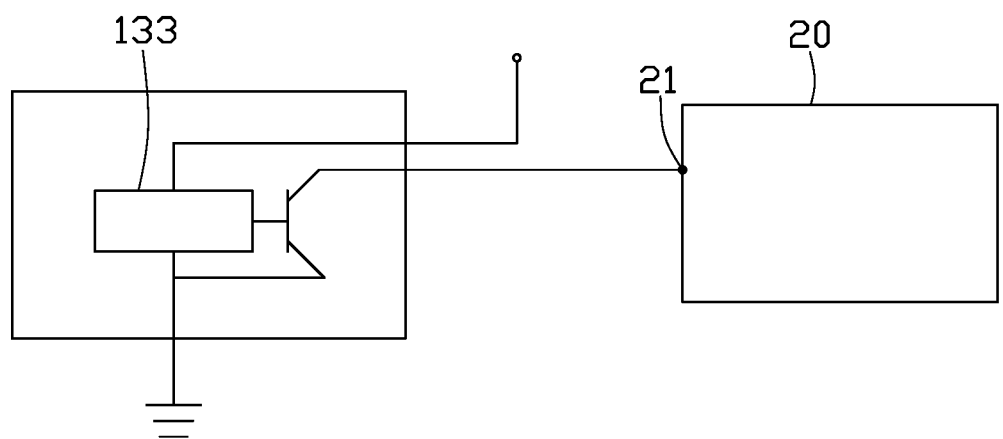
FIG. 4 is a diagram of a circuit structure of a second detection element according to the present disclosure.

FIG. 4 is a diagram of a circuit structure of a second detection element 13.

In one embodiment, the second detection element 13 comprises a switch 133, when the lifting member 11 drives the at least two guide rods 111 to move up to the second height H2 along the lifting direction, the at least two guide rods 111 is farther away from the second detection element 13, so that the switch 133 is switched from connected state to disconnected state. The second detection element 13 outputs the second position signal when the switch 133 is switched from the connected state to the disconnected state, so that the controller 20 can control the lifting member 11 to stop moving down.

In one embodiment, the switch 133 can be designed as a switching circuit consisting of NPN triode. The second detection element 13 triggers the controller 20 by the switching of the switching circuit, to realize the limit of highest position of the lifting member 11.

In one embodiment, the controller 20 comprises a signal input terminal 21, the signal input terminal 21 is electrically connected with the first detection element 12 and the second detection element 13, the signal input terminal 21 maintains a first potential when the signal input terminal does not receive the first position signal or the second position signal.

In one embodiment, the signal input terminal 21 maintains a second potential when the signal input terminal 21 receives the first position signal or the second position signal. The first potential is lower than the second potential.

In one embodiment, the signal input terminal 21 of the controller 20 can be a default pull up voltage of 5V. In order to prevent the wrong action when the lifting mechanism 10 is not correctly connected, the signal input terminal 21 maintains a low potential in the generally operable state. For example, voltage below 5V is defined as the low potential. The pins of the first detection element 12 and the second detection element 13 are grounded. When the first position signal or the second position signal is triggered, the first detection element 12. The pins of the first detection element 12 and the second detection element 13 are open with the ground, so that the signal input terminal 21 maintains a high potential, and the lifting part 11 stops rising or falling. By designing the voltage state change when the first detection element 12 and the second detection element 13 are triggered, and matching the voltage level of the controller 20 to make a logical judgment, the wrong action of the lifting member 11 can be prevented when the first detection element 12 and the second detection element 13 are not correctly connected.

Figure 5:
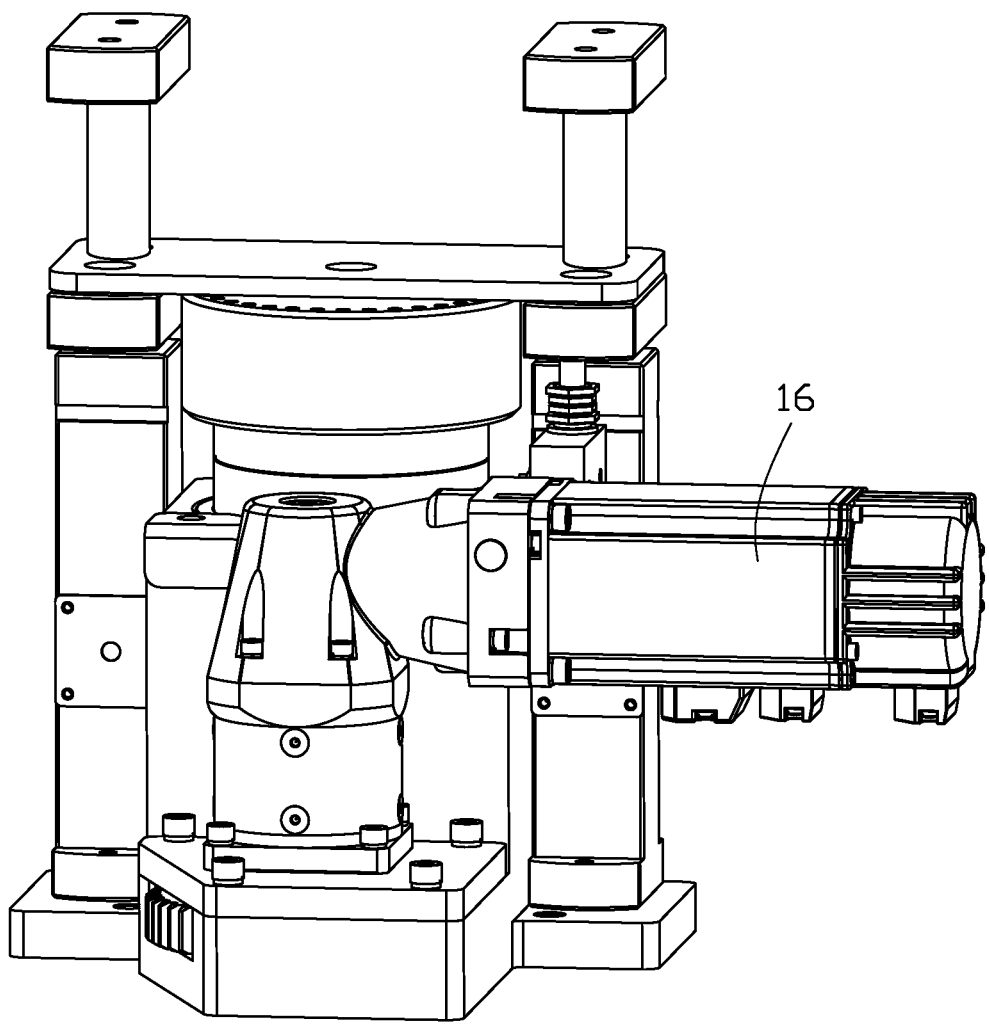
FIG. 5 is a diagram of the lifting mechanism shown in FIG. 1.

FIG. 5 is a diagram of the lifting mechanism 10 shown in FIG. 1.

The lifting mechanism 10 further comprises a driving motor 16, the driving motor 16 is configured to drive the lifting member 11 for moving up or down. The driving motor 16 is electrically connected with the controller 20. The controller 20 controls the drive motor 16 to stop descending when receiving the first position signal, and controls the drive motor 16 to stop ascending when receiving the second position signal.

Referring to FIG. 2, the robot 100 comprises a lifting mechanism 10 and a controller 20, the controller 20 can be electrically connected with the lifting mechanism 10.

The controller 20 can accurately locate the highest position that the lifting member 11 can ascend or the lowest position that the lifting member 11 can descend according to the relevant signal feedback from the first detection element 12 and the second detection element 13, and avoid that a calculation error of monitoring software causes the lifting member 11 exceeding the preset lifting height and results in the lifting member 11 extruding the top plate 112 and the bottom plate and damages the lifting mechanism 10.

The lifting mechanism 10 provided in present disclosure embodiments detects the actual position of the lifting member 11 by two different sensing modes of the first detection element 12 and the second detection element 13. The controller 20 can accurately locate the highest position that the lifting member 11 can ascend or the lowest position that the lifting member 11 can descend according to the relevant signal feedback from the first detection element 12 and the second detection element 13, and accurately stop the lifting member 11 at the highest or lowest position, avoiding that a calculation error of monitoring software causes the lifting member 11 exceeding the preset lifting height and results in the lifting member 11 extruding the top plate 112 and the bottom plate and damages the lifting mechanism 10, thus enhance the functionality and expansibility of the robot 100.

By using the first detecting element 12 and the second detecting element 13, the controller 20 can accurately control the lifting height of lifting part 11 according to the relevant signals feedback from the first detecting element 12 and the second detecting element 13. The lifting parts 11 accurately stop at the highest or lowest position, to avoid the monitoring software calculation error making the lifting parts 11 lifting stroke over the preset height, causing the lifting parts 11 pressing the top plate 112 or the bottom plate 113, and further causing the structure be deformation or damage, the function and expansion of the robot 100 can be enhanced.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A lifting mechanism configured to be electrically connected to a controller of a robot, the lifting mechanism comprising:

a lifting member comprising at least two guide rods, wherein the at least two guide rods are arranged on both sides of the lifting member and extend along a lifting direction of the lifting member, the at least two guide rods are connected through a top plate at the top of the at least two guide rods, the lifting member is fixedly connected to the top plate, the lifting member is configured to drive the at least two guide rods to move up or down along the lifting direction;

a first detection element arranged at a first distance from the top plate, wherein the first detection element is separable from the top plate, the first detection element is configured to output a first position signal in response to a detection of the at least two guide rods are located at a first height, and the first position signal is configured to instruct the controller to control the lifting member to move up or down; and a second detection element arranged at a second distance from the top plate, wherein the second detection element is configured to output a second position signal in response to a detection of the at least two guide rods are located at a second height, and the second position signal is configured to instruct the controller to control the lifting member to move up or down.

2. The lifting mechanism of claim 1, wherein the first detection element comprises a convex column, the convex column is arranged near the top plate and extending in the lifting direction, one part of the convex column is movably set in the first detection element, the other part of the convex column protrudes outside of the first detection element and is separable from the top plate.

3. The lifting mechanism of claim 2, wherein the first detection element further comprises a first contact, a second contact, and a third contact, the first contact is electrically connected with the second contact, and wherein when the lifting member drives the at least two guide rods moving down to the first height in the lifting direction, the top plate presses the convex column so that a circuit connection state is switched from the first contact electrically connecting with the second contact to the first contact electrically connecting with the third contact.

4. The lifting mechanism of claim 3, wherein the first detection element outputs the first position signal when the first contact is electrically connected with the third contact, and the first position signal instructs the controller to control the lifting member to stop moving down.

5. The lifting mechanism of claim 1, wherein the lifting mechanism further comprises a guide rod sleeve, the at least two guide rods are movably arranged in the guide rod sleeve, the second detection element is arranged in a preset position on the guide rod sleeve at a preset distance from the at least two guide rods.

6. The lifting mechanism of claim 5, wherein the second detection element comprises a switch, when the lifting member drives the at least two guide rods to move up to the second height in the lifting direction, the at least two guide rods is farther away from the second detection element, and the switch is switched from a connected state to a disconnected state.

7. The lifting mechanism of claim 6, wherein the second detection element outputs the second position signal when the switch is switched from the connected state to the disconnected state, and the second position signal instructs the controller to control the lifting member to stop moving up.

8. The lifting mechanism of claim 1, wherein the first and the second detection elements are configured to electrically connected to a signal input terminal of the controller, the signal input terminal maintains a first potential when the controller does not receive the first position signal or the second position signal.

9. The lifting mechanism of claim 8, wherein the signal input terminal maintains a second potential when the controller receives the first position signal or the second position signal, the first potential is lower than the second potential.

10. A robot comprising a lifting mechanism and a controller, wherein the controller is electrically connected with the lifting mechanism, the lifting mechanism comprises:
   a lifting member comprising at least two guide rods, wherein the at least two guide rods are arranged on both sides of the lifting member and extend along a lifting direction of the lifting member, the at least two guide rods are connected through a top plate at the top of the at least two guide rods, the lifting member is fixedly connected to the top plate, the lifting member is configured to drive the at least two guide rods to move up or down along the lifting direction;
   a first detection element arranged at a first distance from the top plate, wherein the first detection element is separable from the top plate, the first detection element is configured to output a first position signal in response to a detection of the at least two guide rods are located at a first height, and the first position signal is configured to instruct the controller to control the lifting member to move up or down; and
   a second detection element arranged at a second distance from the top plate, wherein the second detection element is configured to output a second position signal in response to a detection of the at least two guide rods are located at a second height, and the second position signal is configured to instruct the controller to control the lifting member to move up or down.

11. The robot of claim 10, wherein the first detection element comprises a convex column, the convex column is arranged near the top plate and extending in the lifting direction, one part of the convex column is movably set in the first detection element, the other part of the convex column protrudes outside of the first detection element and is separable from the top plate.

12. The robot of claim 11, wherein the first detection element further comprises a first contact, a second contact, and a third contact, the first contact is electrically connected with the second contact, and wherein when the lifting member drives the at least two guide rods moving down to the first height in the lifting direction, the top plate presses the convex column so that a circuit connection state is switched from the first contact electrically connecting with the second contact to the first contact electrically connecting with the third contact.

13. The robot of claim 12, wherein the first detection element outputs the first position signal when the first contact is electrically connected with the third contact, and the first position signal instructs the controller to control the lifting member to stop moving down.

14. The robot of claim 10, wherein the lifting mechanism further comprises a guide rod sleeve, the at least two guide rods are movably arranged in the guide rod sleeve, the second detection element is arranged in a preset position on the guide rod sleeve at a preset distance from the at least two guide rods.

15. The robot of claim 14, wherein the second detection element comprises a switch, when the lifting member drives the at least two guide rods to move up to the second height in the lifting direction, the at least two guide rods is farther away from the second detection element, and the switch is switched from a connected state to a disconnected state.

16. The robot of claim 15, wherein the second detection element outputs the second position signal when the switch is switched from the connected state to the disconnected state, and the second position signal instructs the controller to control the lifting member to stop moving up.

17. The robot of claim 10, wherein the first and the second detection elements are configured to electrically connected to a signal input terminal of the controller, the signal input terminal maintains a first potential when the controller does not receive the first position signal or the second position signal.

18. The robot of claim 17, wherein the signal input terminal maintains a second potential when the controller terminal receives the first position signal or the second position signal, the first potential is lower than the second potential.

* * * * *